United States Patent

[11] 3,579,739

[72] Inventor James Edwin Henry Cosier
Northolt Park, Middlesex, England
[21] Appl. No. 659,247
[22] Filed May 24, 1967
[45] Patented May 25, 1971
[73] Assignee Her Majesty's Postmaster General
London, England
[32] Priority May 25, 1966
[33] Great Britain
[31] 23370/66

[54] APPARATUS FOR FORMING MOULDING COMPONENTS
4 Claims, 5 Drawing Figs.
[52] U.S. Cl. ................................................ 18/30
[51] Int. Cl. ................................................ B29f 1/00
[50] Field of Search ................................ 18/30 (WJ), (PP); 264/262

[56] References Cited
UNITED STATES PATENTS
2,744,290  5/1956  Corson ........................ 18/30

Primary Examiner—H. A. Kilby, Jr.
Attorney—Hall & Houghton

ABSTRACT: A method of and apparatus for sealing together certain component parts of a submarine cable repeater housing. The casing of the housing is closed by a bulkhead which is sealed to the casing by injection moulding polythene round cooperating surfaces on both casing and bulkhead. The apparatus comprises a moulding machine having several moulding cylinders each with a piston and having at least one injection nozzle.

3,579,739

APPARATUS FOR FORMING MOULDING COMPONENTS

BACKGROUND OF THE INVENTION

This invention relates to the formation of components using injection moulding apparatus and more particularly to the formation of annular mouldings for sealing together certain of the metal parts of a submarine cable repeater housing unit.

In the construction of such repeater housings, the repeater or inner unit of the housing is sealed in a tubular casing in such a manner that penetration of water or water vapor is prevented and closure of this casing around the inner unit is normally effected by means of a bulkhead, through which the cable passes, seated on a shoulder in the casing. It is known to braze the bulkhead to the casing but the success of brazing depends upon very close control of the conditions such as temperature, time and fluxing and on the compositions of the steel and brazing alloy. It is also known for the bulkhead to include O-ring seals and to be fixed in position against the shoulder of the casing by screwing a retaining ring against the face of the bulkhead thus completing the sealing off of the inner unit. However, the life of the rubber ring is uncertain. To ensure exclusion of moisture from the inner unit, a lead seal may be provided at the base of the bulkhead. In this case the bulkhead is provided with a boss extending within the casing so as to confine the lead seal in a position between the bulkhead and the casing.

The present invention is a development of a known method of sealing a cable to a metal boss and includes the step of sealing together two metal parts, which previously had to be brazed together as mentioned above, by means of an injection moulding machine. Use of a single orifice injection moulding machine to produce the required seal, however, would necessitate too high a mould temperature and too high a pressure to produce a sound moulding and consequently the method of the invention makes use of an injection moulding machine having several orifices provided around the circumference thereof, the moulding pressure at each orifice being controlled.

SUMMARY OF THE INVENTION

A preferred arrangement of the first and second metal portions as described in the specification of copending British Pat. application No. 23369/66. The first metal portion is an externally castellated peripheral wall round an aperture and the second metal portion is the externally castellated periphery of a closure member for the aperture. In this case the seal is formed to surround completely the adjacent castellations of the wall and closure member, the moulding material, preferably polythene, shrinking and binding on to the castellations during the moulding process.

Preferably the mould member is provided with heating means for each injection cylinder, which means may be cartridge heating elements positioned in the mould itself.

The apparatus may include a pressure system operating on the plurality of pistons each located in one of the injection cylinders, the system being hydraulically operated such that, in use, the system produces simultaneous and uniform injection of moulding material from each charged cylinder into and around the whole of the sealing gap.

The mould member may comprise upper and lower portions, the internal surface of each portion having an O-ring groove formed therein.

DESCRIPTION OF PREFERRED EMBODIMENT

Figure 1:
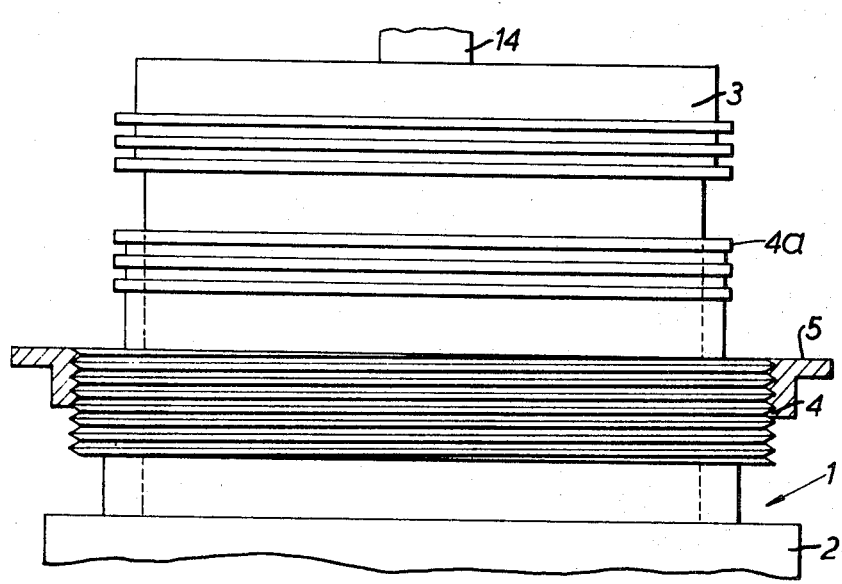
FIG. 1 is a schematic view of the parts to be sealed together, with a supporting ring in position.
Figure 3:
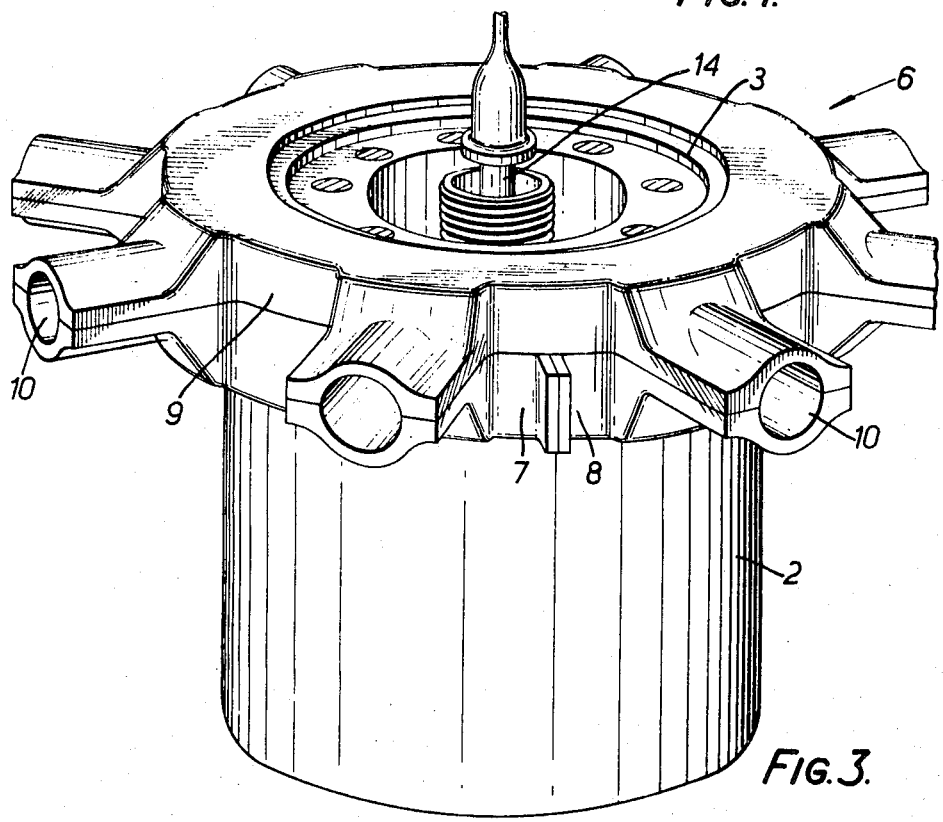
FIG. 3 is a perspective view of assembled mould halves.

The inner unit or repeater 1 of the cable system is housed in a casing 2 to be completed by means of a bulkhead 3. Sealing of the bulkhead to the casing to provide a watertight joint therebetween is achieved using injection moulding apparatus shown most clearly in FIGS. 2—4.

In carrying out the moulding process, the casing 2 is supported vertically with the open end of said casing uppermost to receive the bulkhead 3. The bulkhead is lowered on to the casing and is correctly seated in position thereon either by its own weight or by means such as a hydraulic ram, the cable or cables of the repeater unit passing through appropriate holes provided in the bulkhead.

The external surface of the casing is provided with a peripheral castellated skirt 4a and a screw thread 4 onto which thread is screwed a flat ring 5 of such size that a mould 6 can be supported thereon at a height such that said mould surrounds the junction between the casing and the bulkhead.

Figure 5:
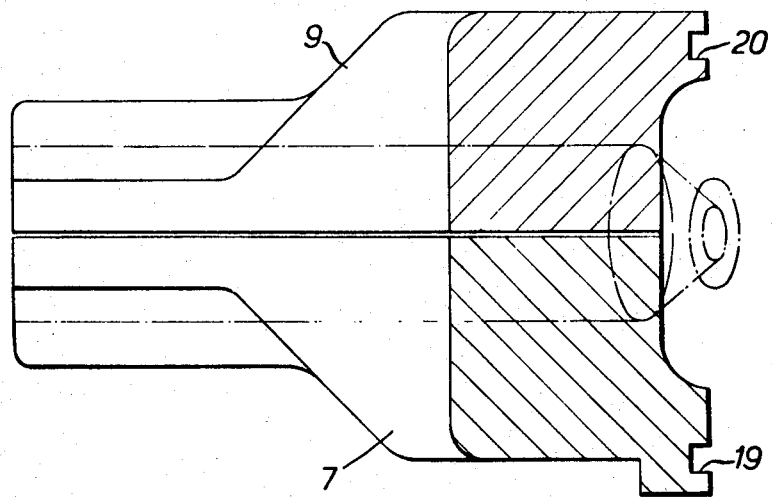
FIG. 5 is a side view, partly in vertical section of part of the assembled mould halves.

The lower half of the mould comprises two semicircular sections 7 and 8 containing an O-ring groove 19 as shown in FIG. 5. The mould is completed by an upper section also containing an O-ring groove 20 again as illustrated in FIG. 5.

In assembling the mould for use, the supporting ring 5 is positioned at the appropriate height on the screw thread 4 and a first O-ring is placed round the casing 2 between the screw thread 4 and the skirt 4a. The two sections 7 and 8 of the lower half of the mould are carefully positioned around the O-ring such that the O-ring is located in the groove 19, the two halves 7 and 8 then being set on the supporting ring 5 and bolted together.

At this stage it is important to ensure that the O-ring has slipped into the groove 19 and has not been pinched in the operation. A second O-ring is located in the groove 20 of the upper section 9 of the mould, and the mould, which is preferably an aluminium-bronze casting, is completed by lowering the upper section 9 over the bulkhead onto the lower section and bolting the two sections together.

Figure 2:
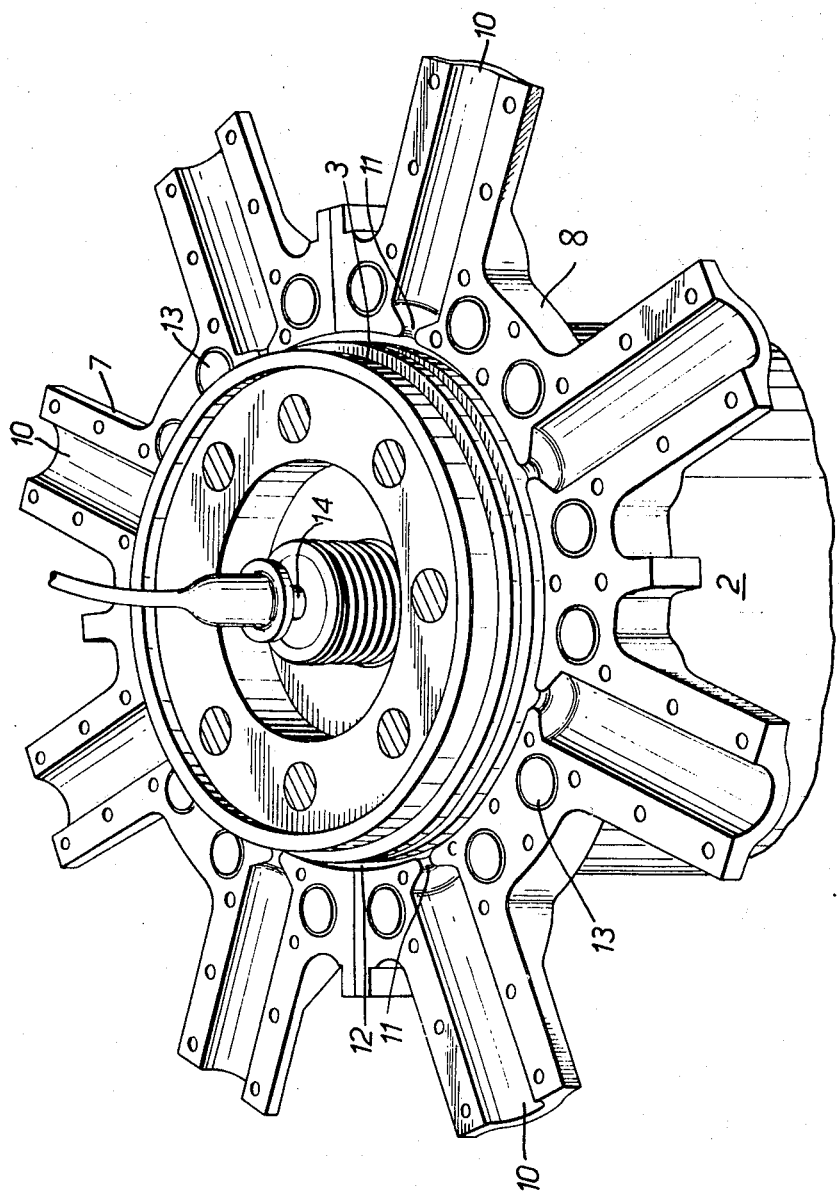
FIG. 2 is a perspective view of a mould half.

As can be seen most clearly in FIG. 2, the mould 6 is provided with eight injection cylinders 10, 1¼ inches in diameter and about 4¼ inches in length. These cylinders are uniformly spaced around the circumference of the mould, the inner end of each cylinder tapering to an injection orifice 11 about five-sixteenth inches in diameter.

The mould is so constructed that an annular gap 12 about five-sixteenth inches thick and about 2⅛ inches in length and bounded by the first and second O-rings, which are in sealing relationship with the casing and bulkhead respectively, is formed between the mould and the members to be sealed, the injection orifices 11 leading to this annular gap.

Each injection cylinder is provided with cartridge heating elements in both upper and lower halves of the mould, the elements of the lower half being shown at 13 in FIG. 2. Provision is also made for heating the bulkhead from the inside and, if necessary, a cooling device may be incorporated to protect the cable gland 14 from overheating.

Figure 4:
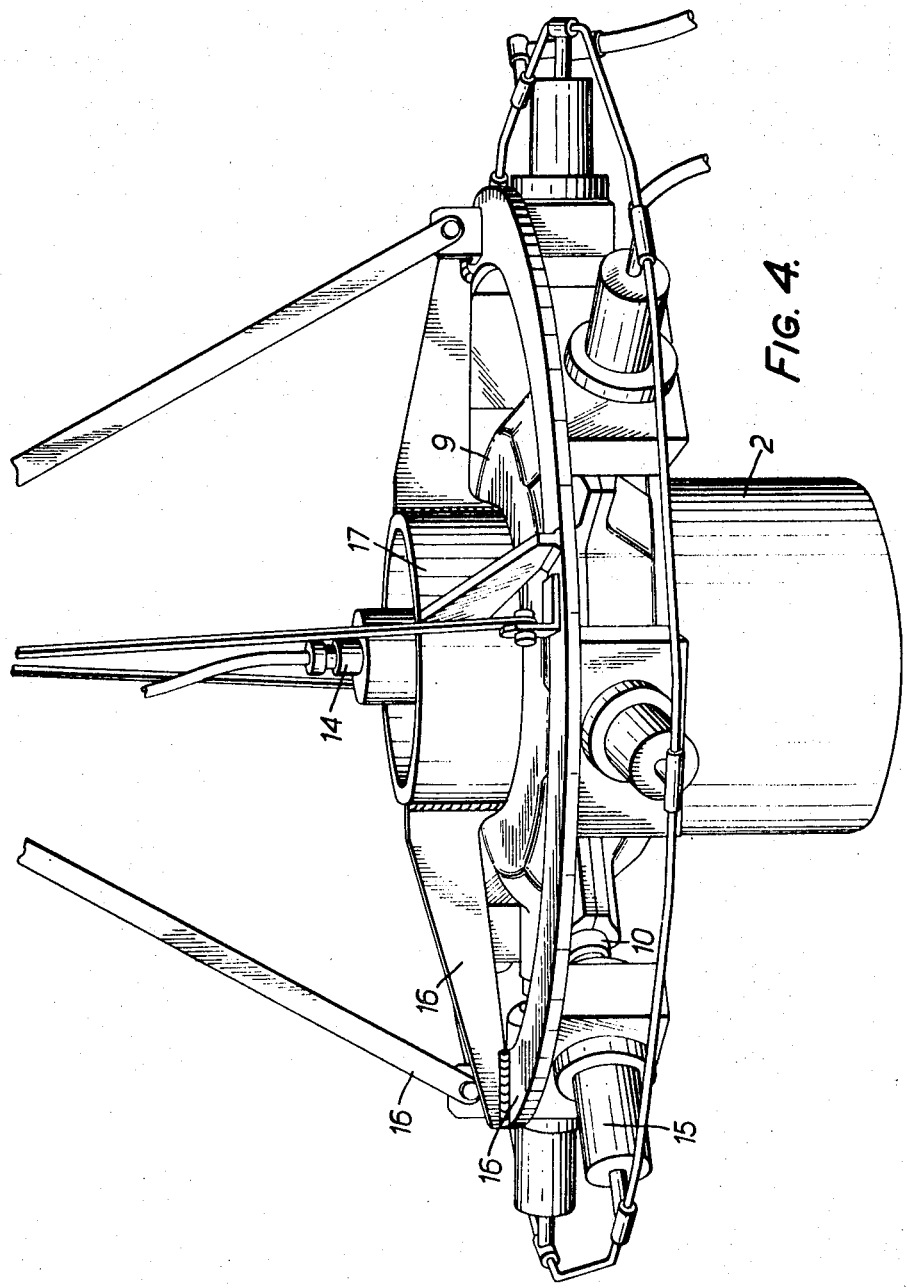
FIG. 4 is a perspective view of the moulding apparatus ready for use.

The pressure system, which is lowered into the position shown in FIG. 4 after the charging of the injection cylinders with the polythene moulding material, comprises eight double-acting hydraulic rams 15 arranged in a supporting framework 16 in positions corresponding to the injection cylinders 10. The framework 16 is constructed so that a central cylindrical section 17 can rest on top of the bulkhead and the weight be taken on an overhead support.

The double-acting hydraulic rams are linked by small-bore tubing to a changeover valve connected in turn to a hydraulic pump (not shown).

After charging each cylinder with polythene and lowering the pressure system into position, the electrical supplies are connected and the various heaters switched on. The temperature of the mould, bulkhead and material at four suitably sited points are measured on temperature indicators and when the polythene temperature has reached about 200° C. the exact value depending upon the grade of polythene used, pressure is applied in the hydraulic rams and polythene injected uniformly into the central annular cavity 12 to produce the seal. The first and second O-rings, which are preferably made of a resilient heatstable silicone polymer, prevent the liquid polythene from being forced out of the mould at its junctions with the casing and bulkhead respectively. When the annular gap has been filled, the system is cooled, the pressure being maintained until the polythene has solidified to compensate for shrinkage. Provision can be made for water cooling of the top and bottom extremities of the mould and for the fitting of air vent valves.

The rams are then withdrawn from the injection cylinders and the pressure system is removed. The mould is then unbolted and removed from the casing, leaving the seal and unused lengths of the charges in position. The latter are cut off and the seal is then ready for X-ray or other tests to assess the perfection of the moulding.

If it is necessary to improve the adhesion of the polythene to the casing and bulkhead, a bonding process may be applied.

In order to prevent the polythene from adhering to the mould, it may be advisable to provide the mould with a nonstick surface.

On completion of the sealing process, the bulkhead may be further held on its seating by threading an extension piece on to the screw thread 4 provided on the casing. The extension piece is internally threaded at its distal end to allow for the screwing therein of a retaining ring carrying a number of pressure screws for holding the bulkhead on its seating. Further details are given in copending British Pat. application No. 23369/66 which also describes the preferred form of the bulkhead and casing sealing surfaces. In this case, the casing 2 is provided with a peripheral, externally castellated skirt, the castellations of which extend round the whole of the circumference of the casing while the bulkhead 3 is provided with a castellated skirt attached to but spaced from the bulkhead to be parallel to the outer surface of the bulkhead and formed round the whole of the circumference thereof. The seal is formed to surround completely the adjacent castellated members, the polythene shrinking and binding on to the castellations during the moulding process.

The advantages of the described method of forming a high pressure seal of extreme reliability are numerous. The low temperature of operation, which is never much above 200° C., does not affect the structure of the steel casing. The bulkhead need not be of the same material as the casing, a comparatively cheap bulkhead material combined with an expensive alloy steel casing being adequate. The polythene seal can easily be cut away without damage to the metal portions of the housing and replaced should it be necessary to gain access to the inner unit. As previously mentioned, the seal can be examined for flaws by X-radiography.

I claim:

1. Apparatus for forming a moulded seal round first and second metal portions to be sealed together comprising a moulding machine including a mould of annular shape defining the outer wall of an open mould chamber, spaced sealing surfaces on said wall defining the extremities thereof, a plurality of injection cylinders integral with said mould and spaced round the periphery thereof, each said cylinder having an injection orifice providing access from the cylinder to the mould chamber, heating means located on the mould for heating same, a supporting frame having an annular portion, a plurality of double-acting pistons equal in number to said plurality of injection cylinders, said pistons being mounted on said annular portion in positions corresponding to the positions of said cylinders, means for supporting said mould round said first and second metal portions, and further means for moving said supporting frame relatively to said mould.

2. Apparatus as claimed in claim 1 wherein said heating means comprise a plurality of heating elements, each heating element being associated with a particular injection cylinder.

3. Apparatus as claimed in claim 1 and further including a fluid pressure system operating on the plurality of pistons each located in one of the injection cylinders.

4. Apparatus as claimed in claim 3 wherein said fluid pressure system comprises hydraulic operating means operable to produce simultaneous and uniform injection of material to be moulded from said cylinders into said mould chamber.